United States Patent [19]

Sanford

[11] 4,005,520

[45] Feb. 1, 1977

[54] FRAME STRUCTURE FABRICATING SYSTEM

[76] Inventor: Arthur Carol Sanford, 2308 Bay Drive, Hillsboro Shores, Pompano Beach, Fla. 33062

[22] Filed: Mar. 9, 1976

[21] Appl. No.: 665,251

[52] U.S. Cl. .................................. 29/432; 29/822; 100/173; 100/DIG. 13; 144/288 C; 227/39; 227/152

[51] Int. Cl.² .......................................... B23P 11/00

[58] Field of Search ............. 29/432, 432.2, 200 A, 29/200 J; 227/152, 143, 154, 39, 44; 144/288 R, 288 C; 100/35, 176, 193, DIG. 13, 173

[56] References Cited

UNITED STATES PATENTS

| | | | |
|---|---|---|---|
| 3,172,125 | 3/1965 | Sanford | 227/152 X |
| 3,212,694 | 10/1965 | Sanford | 227/152 |
| 3,413,703 | 12/1968 | Sanford | 29/432 X |
| 3,431,619 | 3/1969 | Bowers, Jr. | 227/152 X |
| 3,601,882 | 8/1971 | McRae | 29/432 X |
| 3,785,277 | 1/1974 | Schmitt | 100/173 X |
| 3,851,384 | 12/1974 | Kellner et al. | 29/200 A X |
| 3,868,898 | 3/1975 | Sanford | 100/DIG. 13 X |
| 3,896,717 | 7/1975 | Schmitt | 100/100 |

*Primary Examiner*—Victor A. DiPalma
*Attorney, Agent, or Firm*—Hamilton, Renner & Kenner

[57] ABSTRACT

A system for fabricating frame structures having wood chords and web components connected by toothed plates on opposite sides of each joint, wherein an elongated rectangular bed is provided on which to assemble and connect the components, longitudinal rows of conveyor rolls bring the chords forwardly and transfer means move them laterally to areas at the ends of the bed, and the web components are delivered to the sides of the bed. Transfer means are provided to convey the web components laterally onto the bed where jig means hold the chords and web components on the bed in position for assembly with toothed plates on the top and bottom of each joint, gantry pinch rolls are passed over the bed longitudinally to set the plates, transfer means convey the frame structures laterally outward from the bed onto longitudinal rows of conveyor rolls which convey them rearwardly through stationary pinch rolls to fully embed the toothed plates and then deliver the finished structures to a storage area where they are transferred laterally and stacked.

18 Claims, 22 Drawing Figures

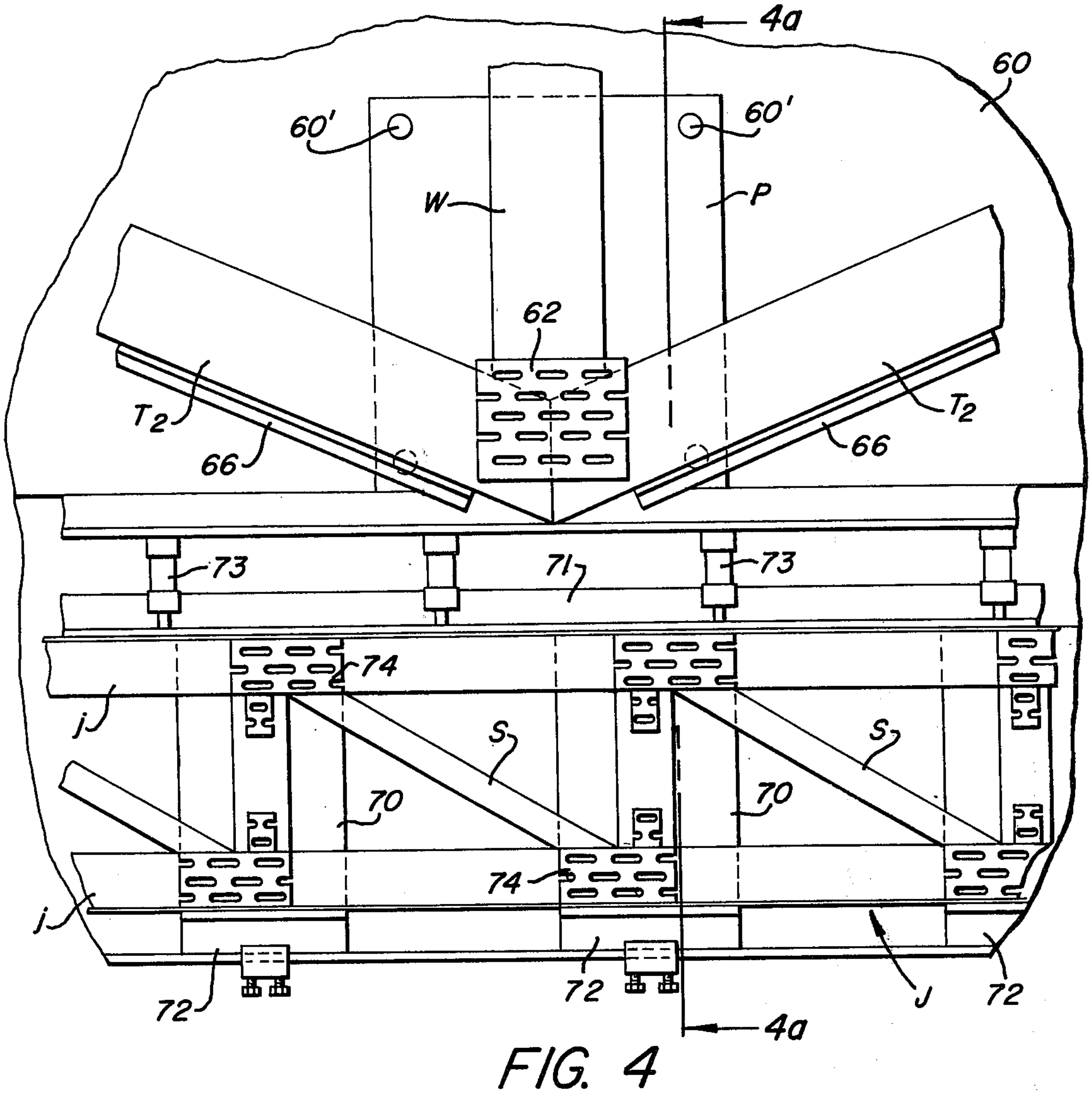
FIG. 4
FIG. 4a
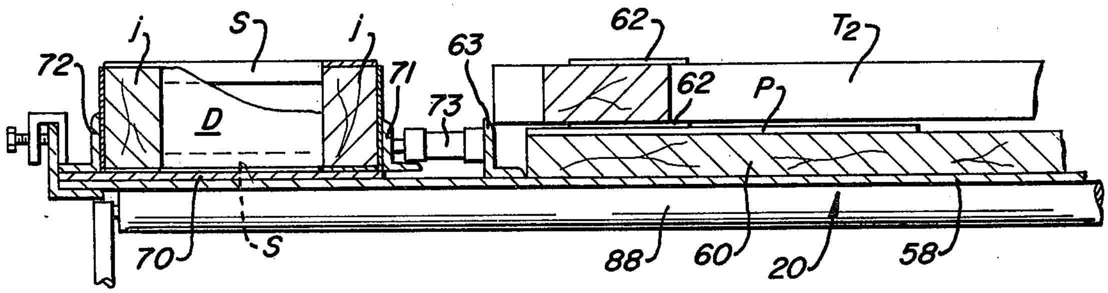

FIG. 9
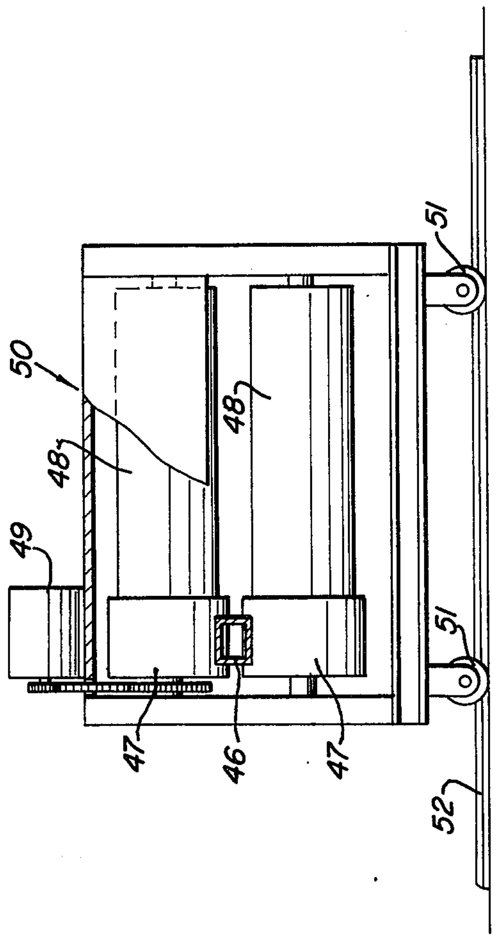
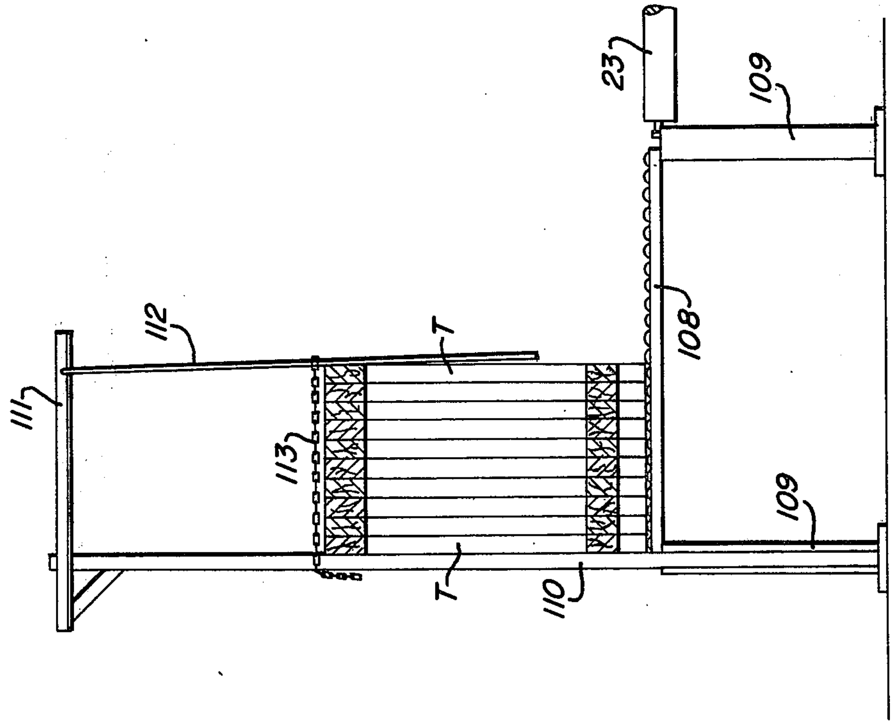
FIG. 11

FRAME STRUCTURE FABRICATING SYSTEM

BACKGROUND OF THE INVENTION

Various methods and apparatus for fabricating wood trusses having their joints secured with toothed metal plates have been proposed over the last several years. My prior U.S. Pat. No. 3,212,694 shows an arrangement of horizontal supports carrying reaction pads to support the joints of a truss in horizontal position when a roller is passed thereover to set the teeth of the plates in the wood, and the truss is then passed through a stationary set of pinch rolls to fully embed the teeth.

A conventional method for fabricating such trusses has been to position the components on a horizontal bed or jig table with the toothed plates tacked on the top and bottom of each joint by manually hammering, then to pass a single roller press over the truss to partially embed the teeth, then to invert the truss, and then to pass the roller over the truss again to fully embed the teeth. This method requires the additional operation of inverting or turning over the truss.

It has been proposed in my prior U.S. Pat. No. 3,868,898 to provide a flat jig table of adjoining panels having sufficient flexibility to conform to the curvature of the lower of a pair of pinch rolls at the nip of the rolls, so that a single pass of the jig table and the truss thereon between the rolls would suffice to fully embed the teeth of the top and bottom plates. While this method has been substantially satisfactory the construction and support of the flexible panels has been expensive.

In all of such prior truss fabricating methods of which I am aware, little or no attention has been directed to the delivery of the various components to convenient locations readily accessible to the assembly table or to the conveying of the finished structures away from the assembly table to a storage area. These operations have been hit-and-miss operations involving excessive time, floor space and manual labor, with the conveying of the finished structures often interfering with the delivery of the components or vice versa.

SUMMARY OF THE INVENTION

All of the chords and web components for fabricating a given run of frame structures such as trusses and joists are first brought in separate bundles or packets to the four sides of the rectangular jig bed. The chord bundles are conveyed forwardly to the bed on a longitudinal row of vertically adjustable rolls and transferred laterally on rollers to areas adjoining the ends of the bed, and the other component bundles may be brought to the sides of the bed by lift trucks. Chords which require splicing end-to-end are conveyed laterally outwardly to one side of the machine and passed through a splicing machine, conveyed longitudinally rearwardly through laterally adjustable stationary pinch rolls to apply a toothed strip of reinforcing steel, and then transferred laterally inward to an area adjoining one end of the bed. After the required number of chords and components for the run are in place, workmen assemble trusses and joists on the bed in side-by-side relation with toothed plates above and below the joints and set the teeth by passing pinch rolls over and under the bed. The assembled trusses and joists are transferred laterally outward onto longitudinal rows of conveyor rollers (including the same vertically adjustable rollers) for conveying them rearwardly from the bed and through the laterally adjustable pinch rolls, to fully embed the teeth of the joint plates, and thence to a stacking area.

It is an object of the present invention to provide an improved and efficient system for fabricating wood and metal trusses and joists in a minimum amount of floor space.

Another object is to provide an improved mass production system for fabricating trusses and joists with a minimum amount of manual labor.

Another object is to provide an improved system for fabricating triangular trusses and flat trusses or joists simultaneously on the same jig bed.

A further object is to provide an improved fabricating system wherein the same conveying means are used to bring the frame components to the bed and to take the finished structures away from the bed.

A still further object is to provide an improved system for fabricating trusses and joists which are accurately dimensioned and securely joined.

BRIEF DESCRIPTION OF THE DRAWINGS

FIG. 4 is an enlarged plan view of the area within the circle designated "FIG. 4" on FIG. 1*c*.

FIG. 4*a* is a sectional view thereof on line 4*a*—4*a* of FIG. 4.

FIG. 9 (on the same sheet as FIG. 11) is an enlarged elevational view, partly broken away and in section, on line 9—9 of FIG. 1*b*.

FIG. 11 is a sectional view on line 11—11 of FIG. 1*a*.

DESCRIPTION OF PREFERRED EMBODIMENTS

Figure 1A:
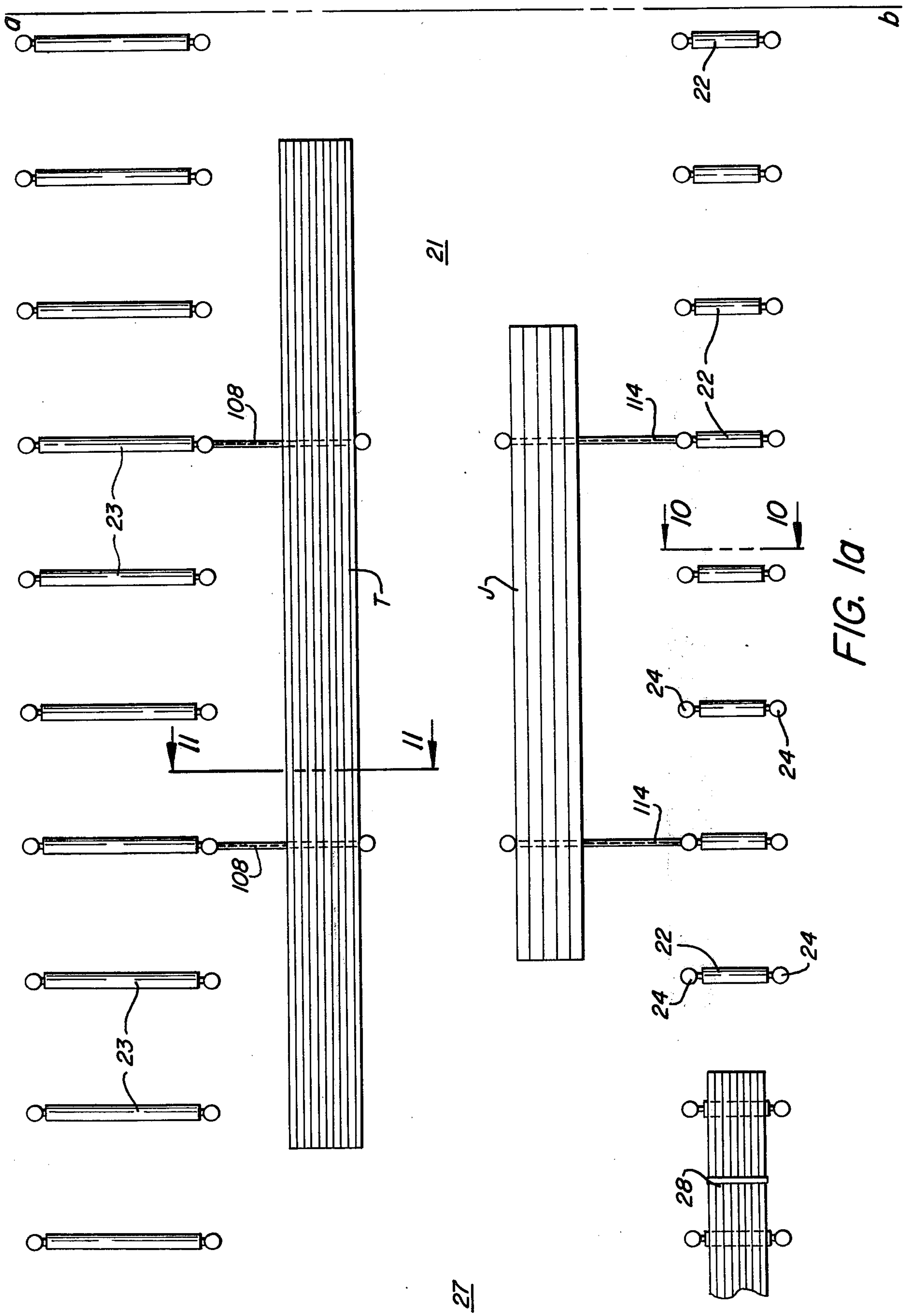
FIGS. 1*a*, 1*b* and 1*c* taken together form a composite schematic plan elevation of an arrangement of apparatus for carrying out the improved method or system of the invention, the division line a-b coinciding with line *a'-b'*, and division line *c-d* coinciding with line *c'-d'*.
Figure 1B:
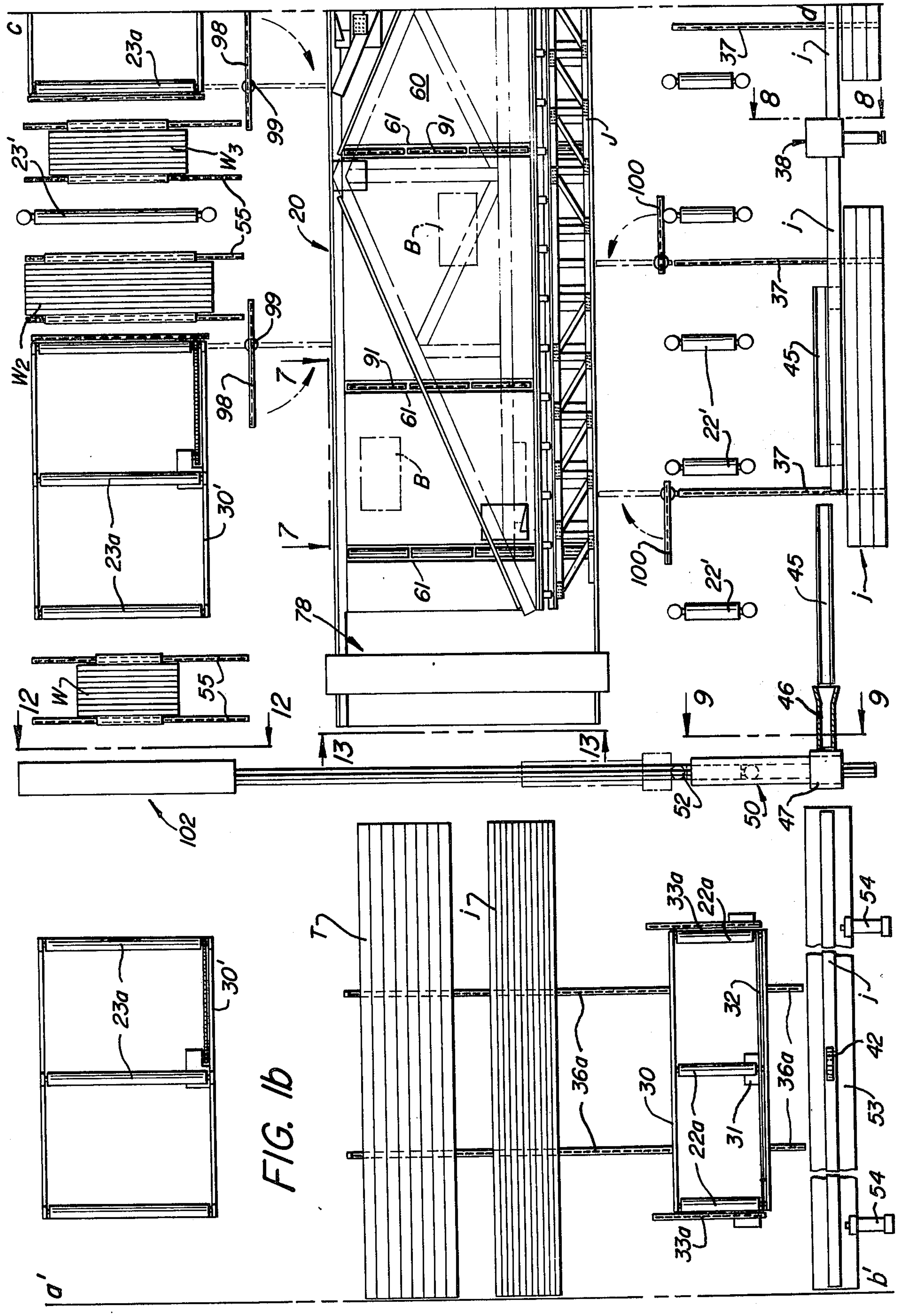
Figure 1C:
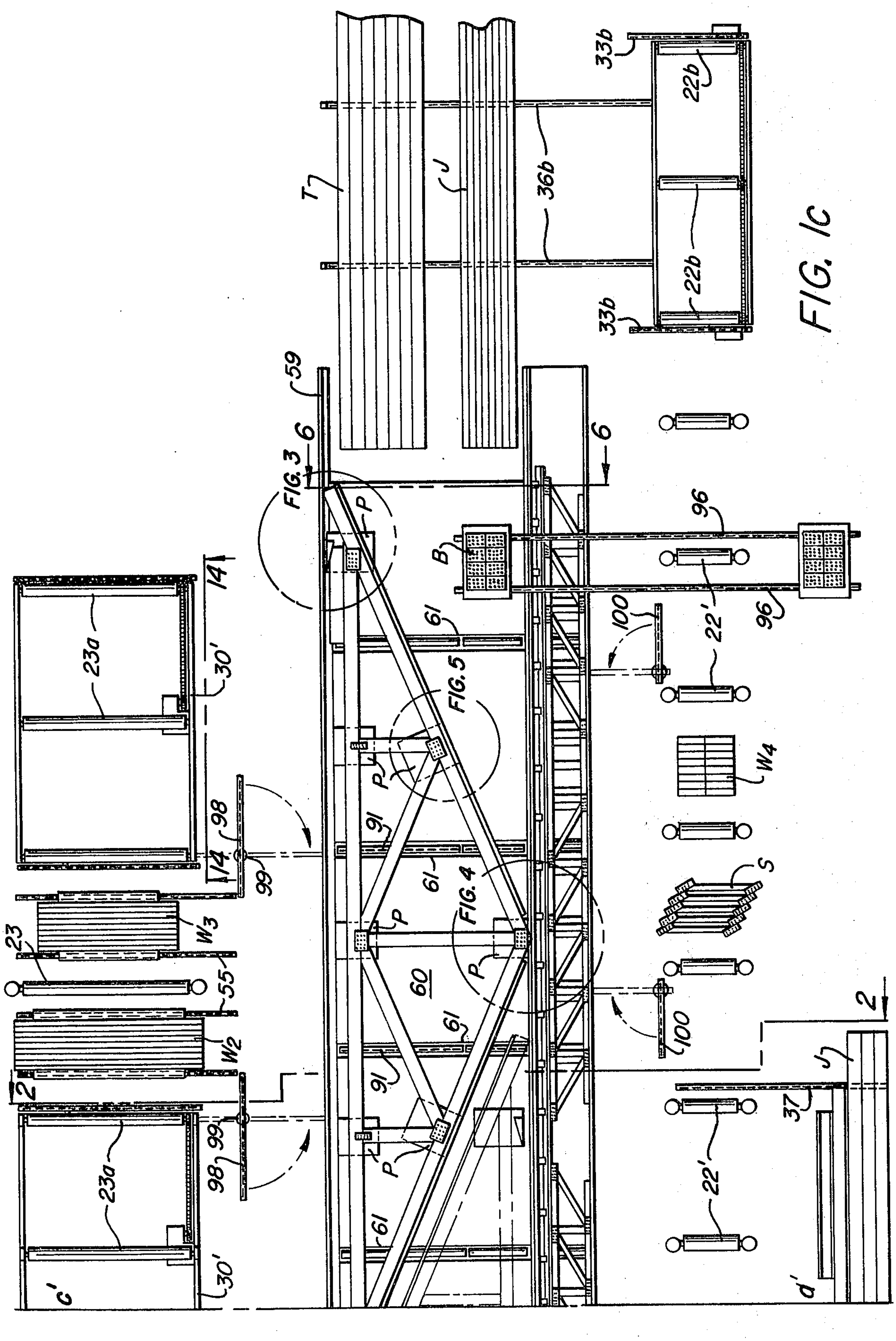

Referring first to FIGS. 1*a*, 1*b* and 1*c*, the elongated rectangular bed on which the triangular trusses and flat trusses, hereinafter referred to as joists, are assembled is indicated generally at 20. Adjoining the left end of the bed is an elongated storage area indicated as a whole at 21 where truss and joist components may be stored as well as finished trusses and joists. All of the wood components for the trusses and joists are cut from standard 2 × 4's.

Figure 10:
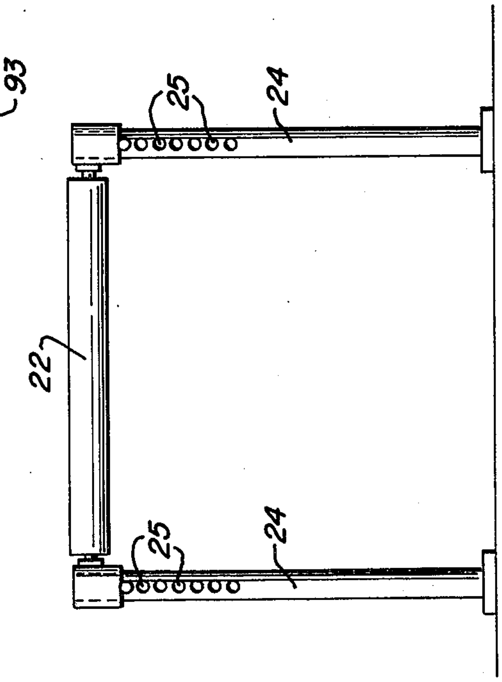
FIG. 10 is an enlarged elevational view on line 10—10 of FIG. 1*a*.

Along both sides of the bed 20 and storage area 21 are longitudinal rows of spaced-apart conveyor rolls. The rolls 22, 22', 22*a* are shorter in axial length than the rolls 23, 23', 23*a* in the other row and the rolls 22 and 23 are spaced apart on 6-foot centers so that standard size fork lift trucks can pass between them during loading and unloading operations. As shown in FIG. 10, the rolls 22 are preferably mounted for vertical adjustment on columns 24 by supporting the end bearings in tubular members 25 telescoped over the columns and providing series of vertical holes 26 in the columns through which pins may be inserted to support the rolls at adjusted heights. The rolls 23 are similarly mounted for vertical adjustment.

PREPARATION FOR FABRICATING A RUN OF TRUSSES AND JOISTS

As indicated in FIG. 1*a*, bundles 28 of wood chords for the trusses and joists are taken from an adjoining loading area 27 (partially shown) and placed on the adjacent conveyor rolls 22. From this location forwardly the rolls 22 are adjusted at graduated heights downwardly so that the bundles 28 will move by gravity forwardly on a slightly downward incline to the set of three power-driven rolls 22*a* longitudinally aligned with rolls 22. If desired, chord bundles may be conveyed forwardly on rolls 23.

The rolls 22*a* are journaled in a frame 30 which supports an electeric motor 31 driving the middle roll 22*a* which is operatively conncted to the two end rolls by sprocket chains indicated at 32. Mounted at the ends of the frame 30 are laterally extending skate roller bars indicated at 33 which are mounted to be raised and lowered by means of air cylinders 34 for transferring chord bundles laterally.

Figures 2, 2A:
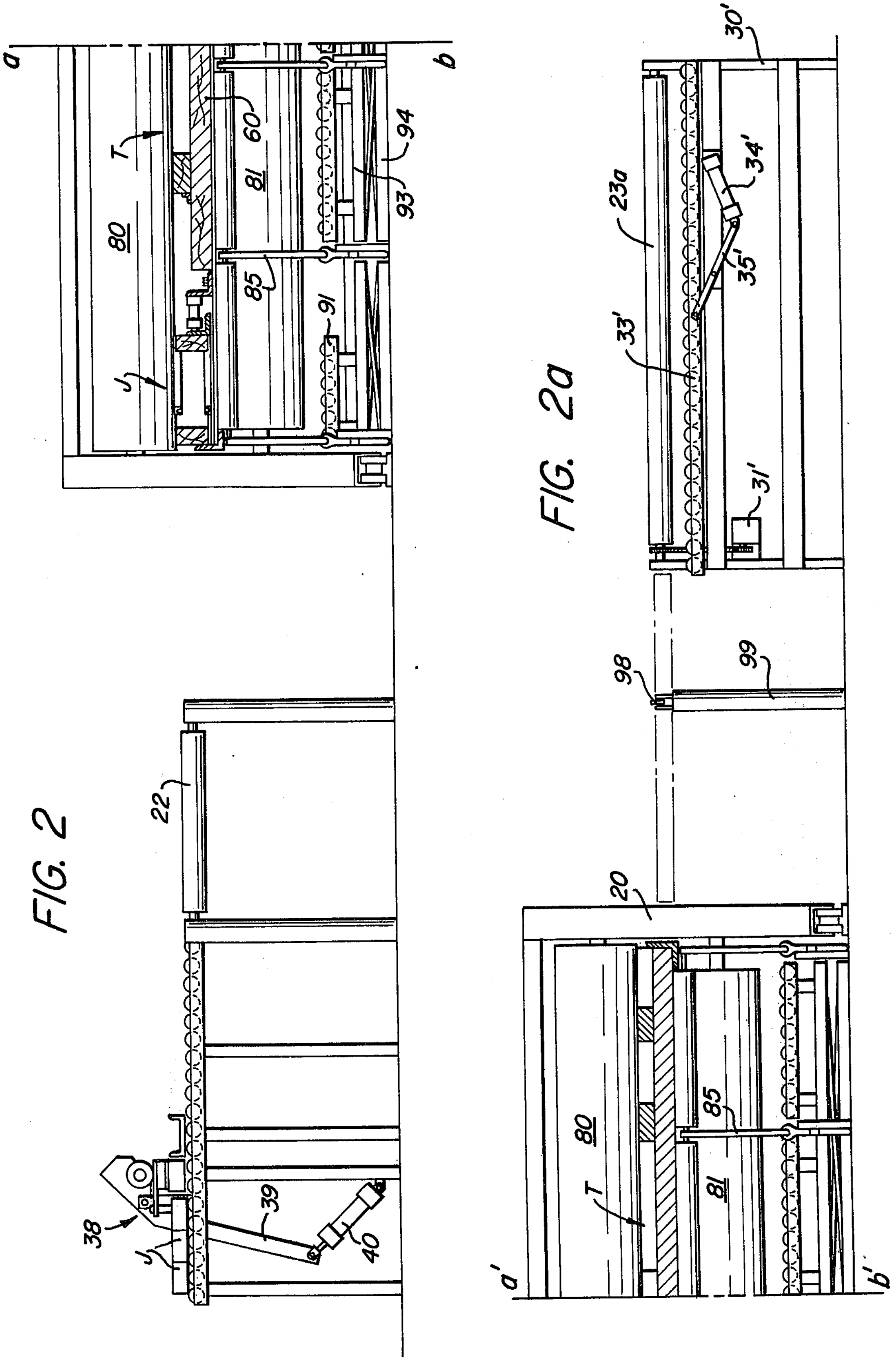
FIGS. 2 and 2*a* taken together are a composite cross section on line 2—2 of FIG. 1*c*, the division line *a-b* coinciding with line *a'-b'*.
Figure 14:
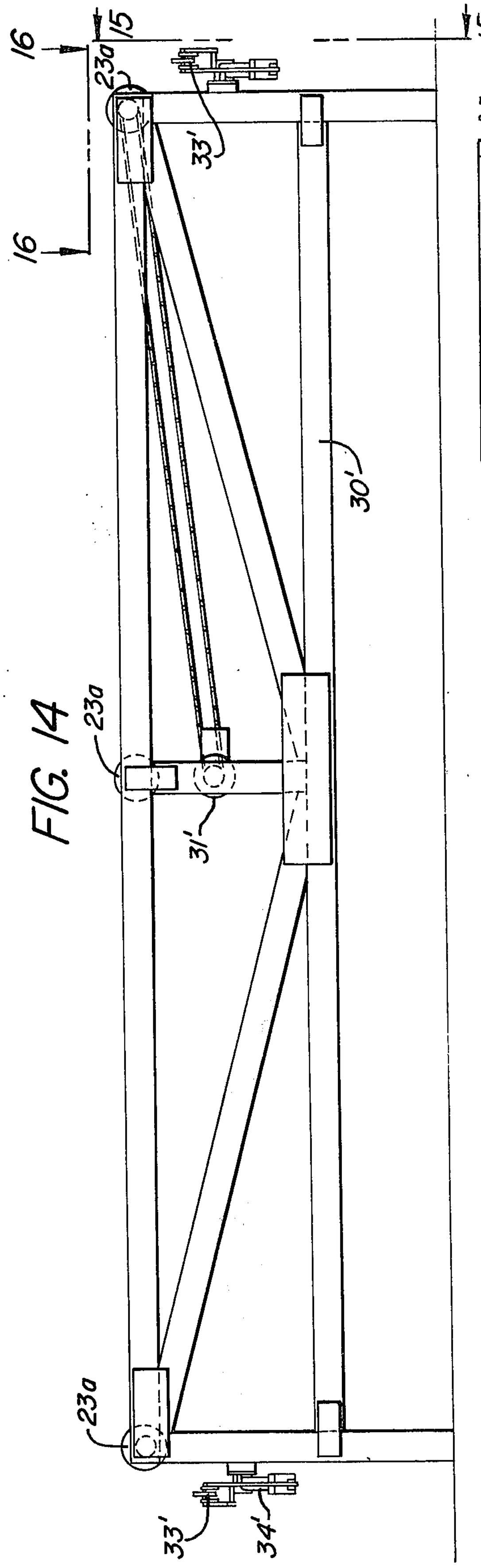
FIG. 14 is an enlarged elevational view on line 14—14 of FIG. 1*c*.
Figure 16:
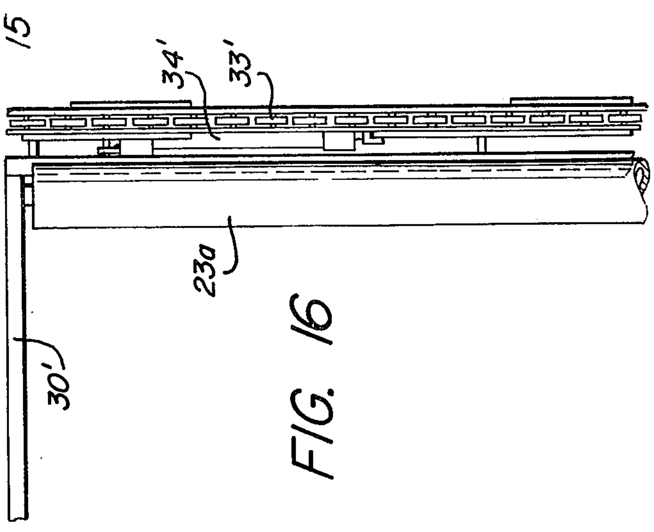
FIG. 16 is a plan elevational view on line 16—16 of FIG. 14.
Figure 15:
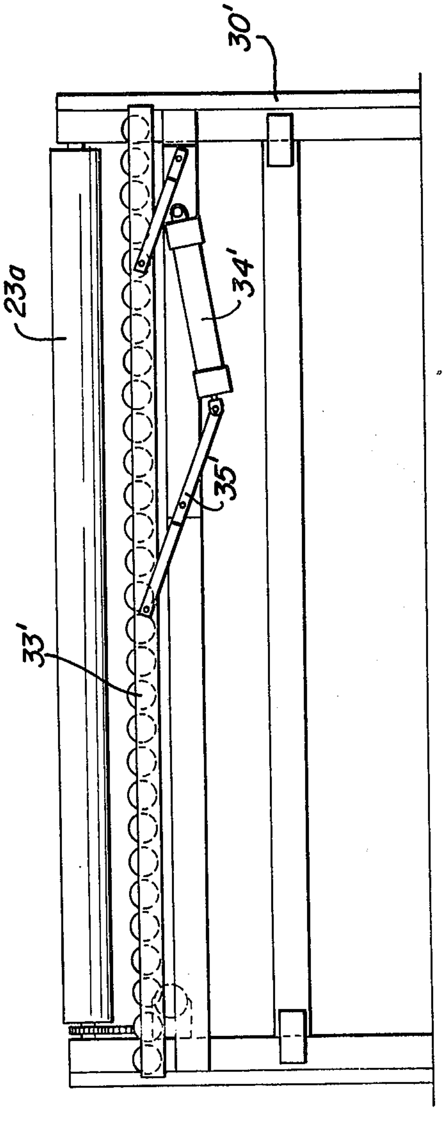
FIG. 15 is an elevational view on line 15—15 of FIG. 14.

The construction and operation of the bars 33 is similar to that shown at the right end of FIg. 2*a* and in greater detail in FIGS. 14 – 16, wherein a frame 30' on the other side of the bed 20 has three longer rolls 23*a* journaled therein with a motor 31' driving the middle roll by means of a chain drive connected to at least one of the end rolls. The skate roller bars 33' carry series of skate rollers and are adapted to be raised above the level of rolls 23*a* by linkages 35' powered by air cylinders 34'.

Thus, as the chord bundles are conveyed onto the rollers 22*a*, some of the bundles are transferred laterally inward by raising the skate roller bars 33*a* and pushing the bundles laterally inward thereover and then over skate roller bars 36*a* to a storage area adjacent to the rear end of the bed 20. Other bundles are conveyed longitudinally over aligned rolls 22' extending in a row alongside the bed 20 to a set of power-driven rolls 22*b* in a frame 30 having skate bars 33*b* for transferring the bundles over skate roller bars 36*b* to a storage area adjacent to the front end of the bed 20.

The chord bundles thus transferred to the areas adjacent the ends of the bed are unfastened and the individual chords stacked in readiness to be manually moved onto the bed as needed for assembly. Adjacent each end of the bed, the stacks of individual truss chords are indicated at *t* and the joist chords at *j*.

Figure 8:
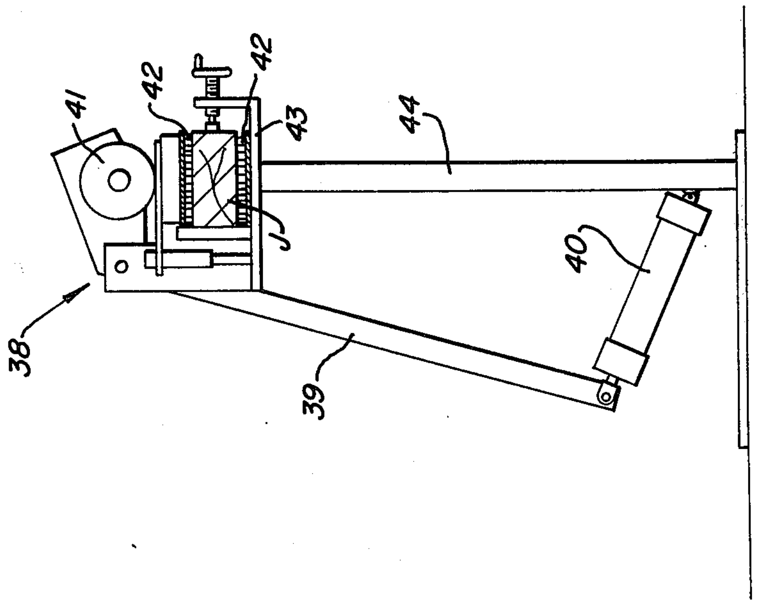
FIG. 8 is an enlarged vertical sectional view as on line 8—8 of FIG. 1*b*.

Certain of the joist chords *j* are required to be spliced end-to-end before being transferred to the storage areas at the ends of the bed 20. As shown in FIGS. 1*b*, 1*c* and 2, a splicing area including a splicing machine 38 is provided laterally outward of the rolls 22' along one side of the bed 20 and skate roller bars 37 are provided to transfer some joist bundles laterally to the splicing area where they are unfastened. These bars 37 may be operatively connected to power lift mechanisms similar to mechanisms 34', 35' connected to bars 33'. Referring to FIG. 8, the splicing machine 38 preferably includes a lever 39 powered by an air cylinder 40 to force a pressure roller 41 downwardly and embed top and bottom toothed plates 42 into the wood at the joint between the ends of two wood chords *j* supported on plate 43 at the top of column 44.

The spliced chord is then turned over into longitudinally aligned guide channels 45, wherein one or more toothed metal reinforcing strips may be laid on one side and the strip embedded in the chord by pushing the chord and strip longitudinally rearwardly through a rectangular confining tube 46 and between the collar rolls 47 on a pair of pinch rolls 48, the upper roll being driven by a motor 49 (FIG. 9). The roll stand indicated as a whole at 50 is supported by wheels 51 on a lateral track 52, so that the roll stand can be moved out of the way to the phantom position shown in FIG. 1*b* when bundles are being conveyed forwardly from conveyor rolls 22*a* to rolls 22'.

The spliced reinforced chords *j'* pass from the collar rolls 47 onto a supporting table 53, and adjacent air cylinders 54 are provided to push the chords laterally onto skate roller bars 36*a'* and then over raised bars 33*a* and extension bars 36*a* to the storage area in readiness to be moved individually to the bed 20 as needed.

While the truss and joist chords are being brought to the storage areas at the ends of the bed 20 in the foregoing manner, bundles of the other truss and joist components are being brought to the sides of the bed by fork lift trucks where they are stacked between the rolls 22' and 23' so as to be readily accessible to the operators working between the rolls and the sides of the bed. These stacks of components are indicated schematically in FIGS. 1*b* and 1*c*, web components for the trusses being indicated at $w_1$, $w_2$ and $w_3$. Preferably, skate roller bars 55 extending laterally at floor level support pallets carrying the web components $w_1$, $w_2$ and $w_3$ so that these pallets can be later transferred laterally inward toward the bed as the components are needed. The wood web components for the joists are indicated at $w_4$ and metal struts with attached toothed plates at *s*.

All of the various wood components may be cut to length and beveled by the supplier before being bound into bundles. Alternatively, a cutting machine (not shown) may be provided in the space at the right end of the conveyor rolls for cutting and beveling the wood components.

Before fabricating a desired run of trusses and joists, as for example in an 8-hour turn, the required supply of all the chords and components for the run are deposited at the ends and sides of the bed, as previously described, so that there will be no interruption in the fabricating operation during the turn. Then another complete supply for the next turn is deposited at these storage areas in readiness for the next fabricating operation.

FABRICATING A RUN OF TRUSSES AND JOISTS

As shown in FIGS. 1*b*, 1*c*, 2, 2*a* and 6, the bed 20 is adapted for fabricating trusses indicated generally at T over the major portion of its width, and joists indicated generally at J along one side thereof. It will be understood that the bed may be made wide enough to accommodate joists J on both sides.

Figure 6:
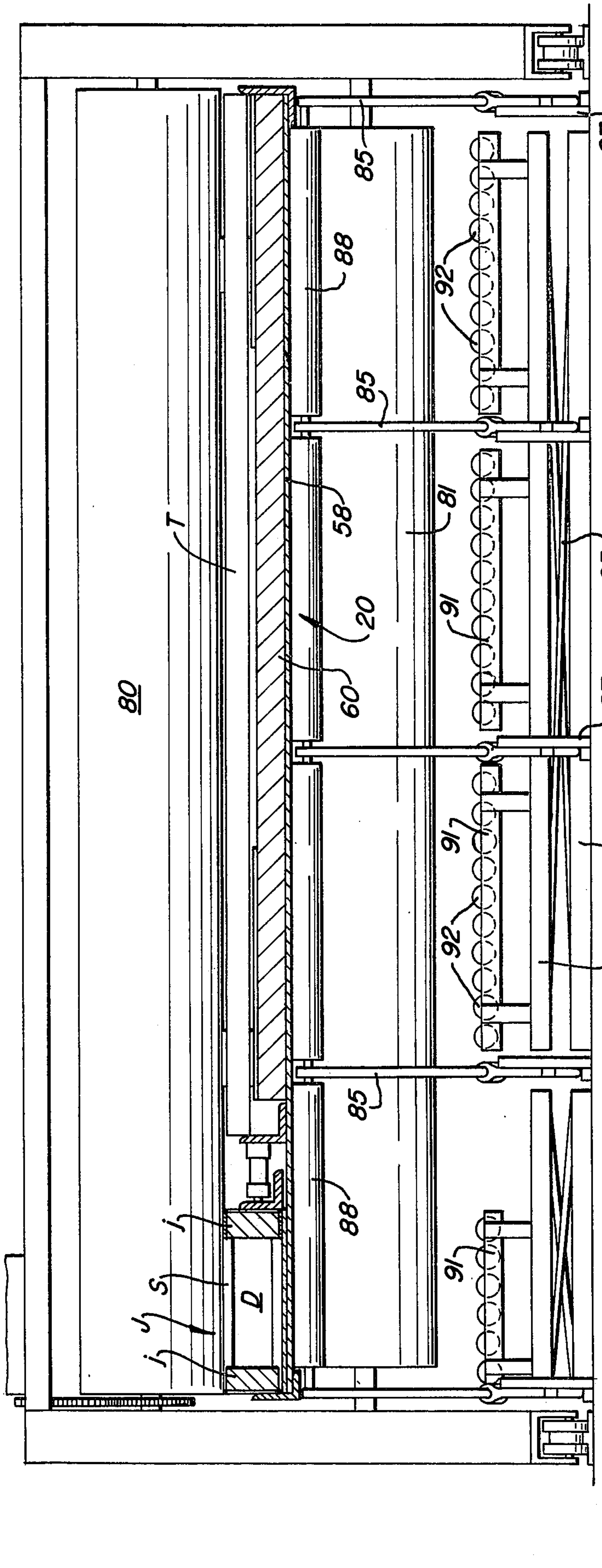
FIG. 6 (on the same sheet as FIG. 10) is an enlarged sectional view on line 6—6 of FIG. 1*c*.

Referring particularly to FIGS. 4*a* and 6, the bed 20 comprises a metal bottom plate 58, preferably of aluminum, secured to longitudinal angles 59 extending along the sides of the bed. The plate 58 supports a wood bed 60 approximately 2 inches thick extending across the truss area, and the wood components *t* and *w* of the truss are assembled flatwise on the bed 60. The chords *j* of the joists are supported edgewise on the bottom plate 58, so that the level of the tops of the chords *j* is substantstantially equal to the tops of the truss components when the pinch rolls pass thereover, as hereinafter described.

The plate 58 and the wood bed 60 supported thereon are provided with laterally extending slots 61 for vertically movable lift-out bars to pass through and lift the assembled trusses and joists above the bed for lateral transfer thereof as hereinafter described.

Figure 3:
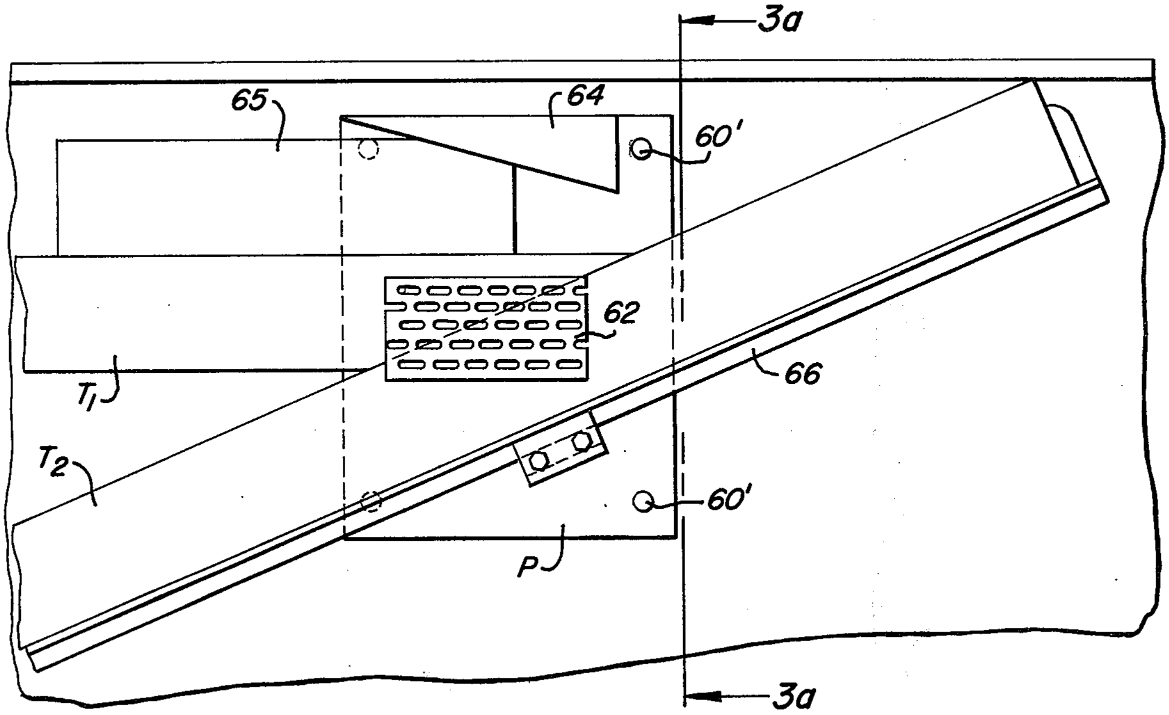
FIG. 3 (on the same sheet as FIG. 5) is an enlarged plan view of the area within the circle designated "FIG. 3" on FIG. 1*c*.
Figure 5:
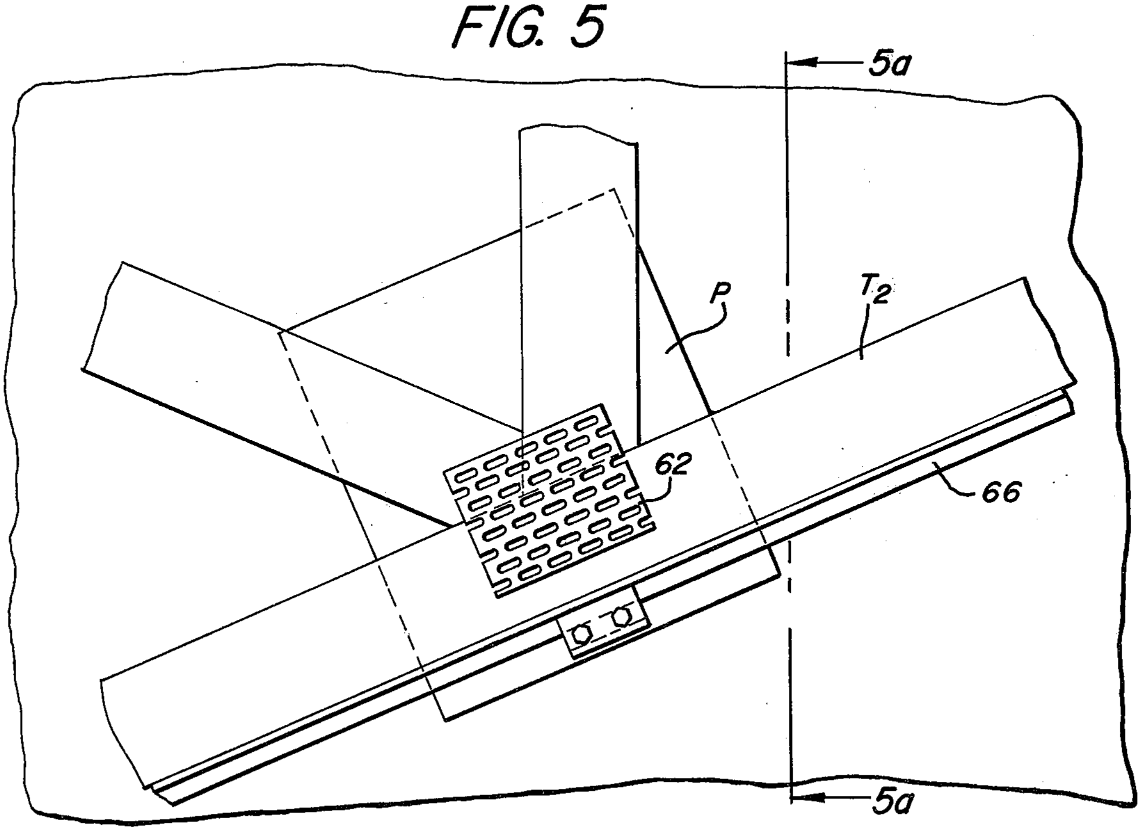
FIG. 5 is an enlarged plan view of the area within the circle designated "FIG. 5" on FIG. 1*c*.
Figure 3A:
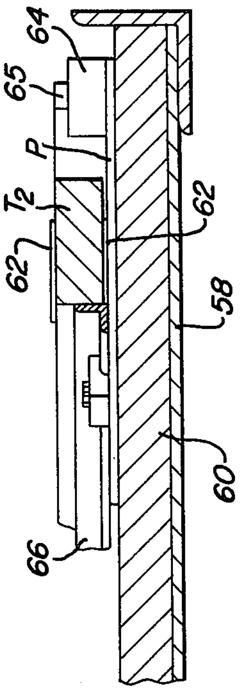
FIG. 3*a* (on the same sheet as FIG. 8) is a sectional view on line 3*a*—3*a* of FIG. 3.
Figure 5A:
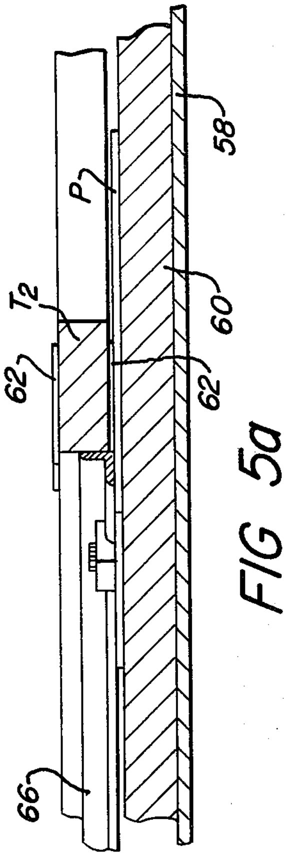
FIG. 5*a* (on the same sheet as FIG. 8) is a sectional view on line 5*a*—5*a* of FIG. 5.

The trusses T comprise chords and web components of 2 × 4's which are connected together at the joints by toothed metal plates as more particularly disclosed in FIGS. 3, 4 and 5. The joists J comprise parallel chords *j* of 2 × 4's with 2 × 4 spacers *d* at right angles, and inclined metal struts *s* having toothed plates attached to their ends and embedded in the edges of the cords *c*. The construction of these joists is more particularly disclosed in my U.S. Pat. No. 3,416,283.

Referring to FIG. 1*c* and the enlarged areas thereof on FIGS. 3, 4 and 5, metal pads P are secured by removable nails 60′ on the top surface of the wood panels 60 under the truss joints. Toothed plates 62 of various sizes are located during assembly of the truss components at the top and bottom of each joint with the teeth extending inwardly toward the wood. The shape and construction of the teeth may be such as shown in my U.S. Pat. No. 3,479,920, although other tooth designs may be used. Preferably, the pads P have locating pins for registering with the punched-out openings formed by the teeth in the bottom plates for positioning them in registration with the joints between the components.

As shown in FIG. 4, the apex of the truss as assembled may abut a longitudinal angle 63 secured to the bottom plate 58 of the bed. At each of the joints along the bottom chord of the truss the pads P are provided with wedge-shaped projections, so that a tapered wood block can be driven between the wedge and the bottom chord of the truss. The pad P at the heel joint is shown in FIG. 3 and has the wedge projection 64 with the tapered block 65 driven between the wedge and the bottom chord $t_1$ Opposing the wedging force is an angle 66 extending along the upper chord $t_2$ and secured to the pad. The angle 66 preferably has a hooked end 67 extending around the soffit of the truss. Referring to FIG. 5, the angle 66 is secured to the other pads P at the joints of the upper chords. As indicated in 1*b* and 1*c*, a second triangular truss T′ may be assembled simultaneously on the bed 20, and truss T′ may be the same or a different design and shape of truss.

As shown in FIGS. 4 and 4*a*, the joists J are assembled on rectangular metal pads 70 supported on the plate 58 and clamped between an inner longitudinal angle 71 slidable over the inner margin of the pads, and outer angles 72 slidable on the pads. A series of air cylinders 73 mounted on the stationary angle 63 are provided to force the angle 71 outwardly and clamp the spacers *d* between the chords *j* to hold the assembled joists in position after the toothed ends 74 of the top and bottom struts *s* have been placed above and below the chords *j*. The metal pads 70 are the same thickness as the pads P to maintain the top surfaces of the chords *j* at the same level as the top surfaces of the truss chords and wood components, and the pads have locating pins for registering the bottom plates at each joint. Adjusting yokes 75 may be attached to the angles 72 with adjusting screws abutting the edge flange 76 of the bottom plate 58, for the purpose of applying a slight chamber to the adjacent chord *j* of the joist.

Figure 13:
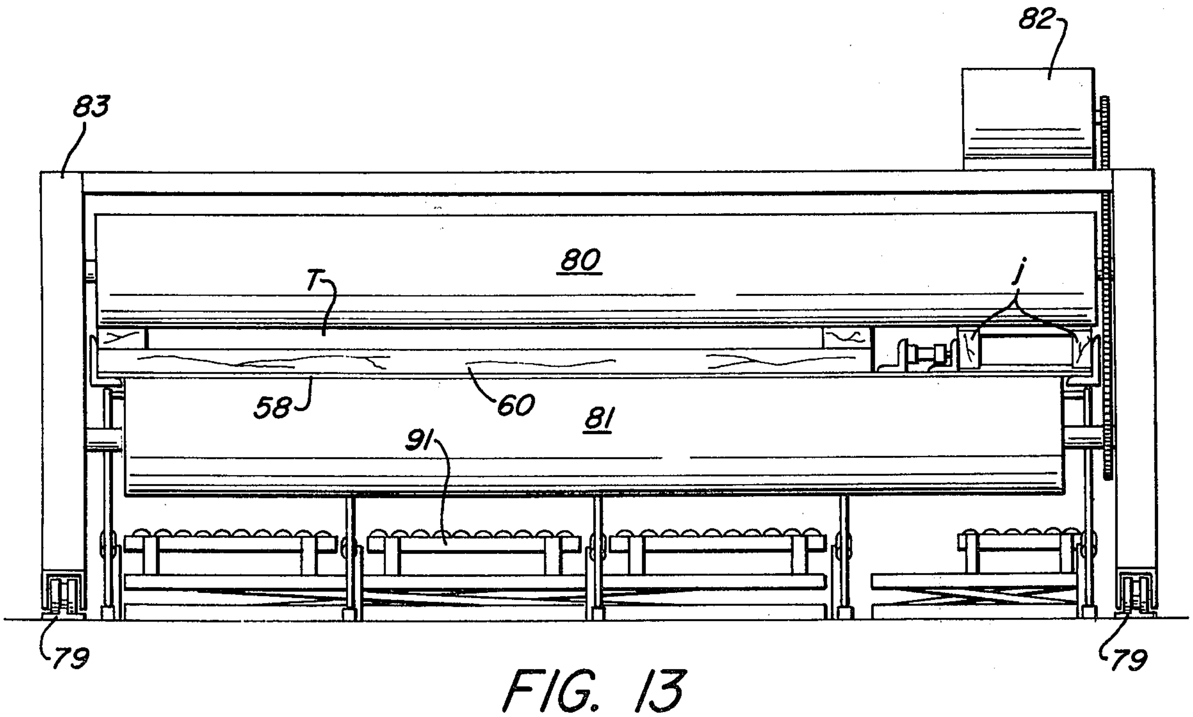
FIG. 13 is an enlarged elevational view on line 13—13 of FIG. 1*b*.

After the trusses T and T′ and the joists J have been assembled and clamped in position on the bed 20, a pair of pinch rolls indicated generally at 78 is passed longitudinally over the assemblies and under the bed to set the teeth of the plates 62 into the truss joints and the teeth at the ends 74 of the struts *s* into the top and bottom edges of the chords *j* of the joists J. The gantry roll stand 78 is shown at the rear end of the bed and rolls on parallel tracks 79 at the sides of the bed. Referring to FIG. 13, the roll stand comprises an upper roll 80 and a lower roll 81 driven by a motor 82 mounted atop the frame 83. The bight between the rolls is substantially equal to the vertical distance between the bottom surface of the bed plate 58 and the top level of the truss components *t* and the joist chords *j*. Accordingly, as the upper roll passes over the bed it will set the teeth of the plates 62 and also at the ends 74 of the struts *s* into the wood.

Figure 7:
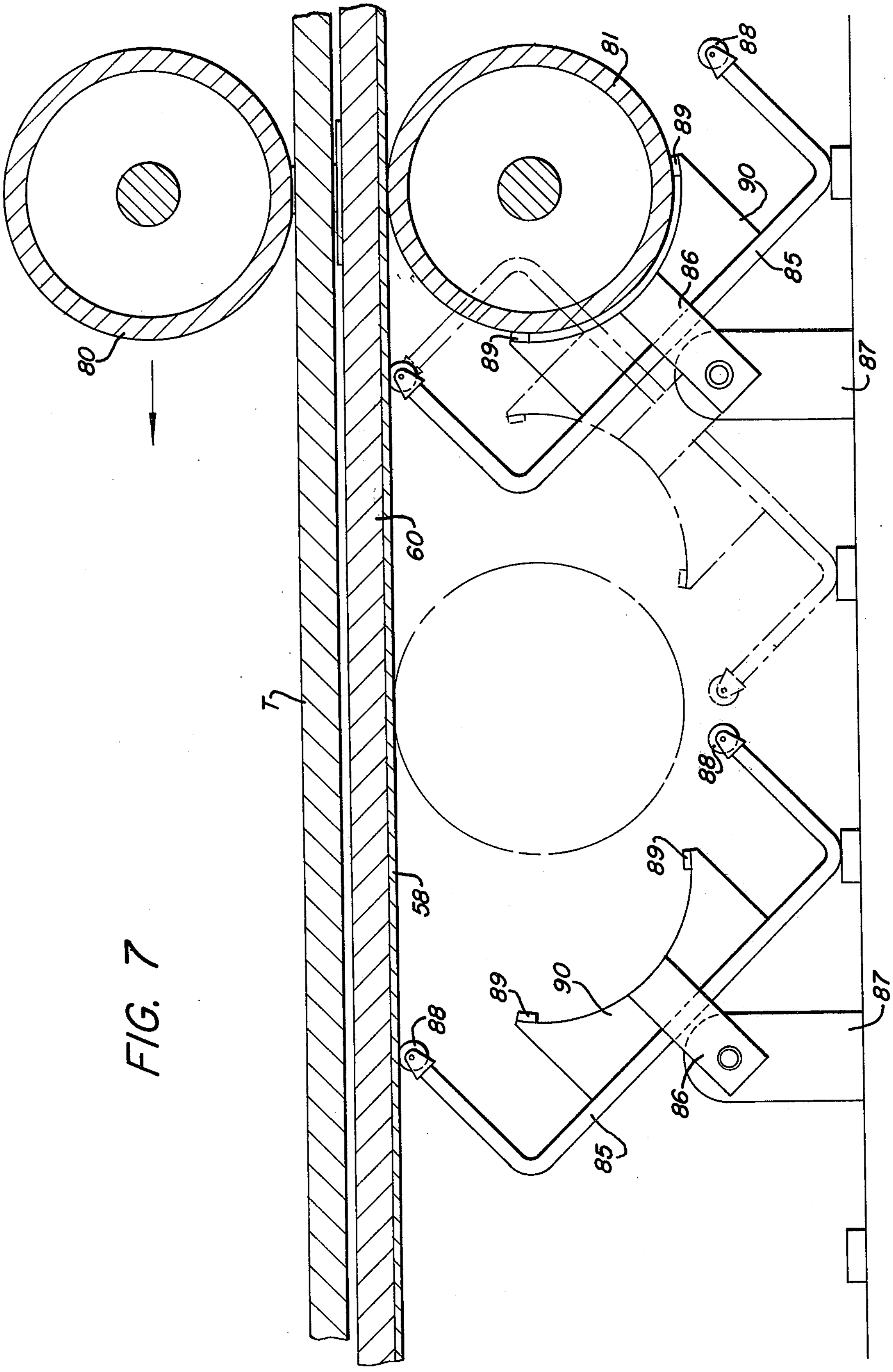
FIG. 7 is an enlarged sectional view as on line 7—7 of FIG. 1*b*.

In order that the roll 81 may pass under the bed in rolling contact with the bottom surface of the bed 58, the bed is supported by longitudinally spaced lateral rows of rocker supports shown in FIGS. 6 and 7. Each rocker support comprises a U-shaped bar 85 having a medial support arm 86 pivotally mounted on a base bracket 87. The bars 85 journal roller 88 at each end for alternately supporting the bed, and there are preferably four rollers 88 extending laterally of the bed and supported at their ends between pairs of the bars 85. As the rolls 80 and 81 pass over the bed the bottom roll 81 successively strikes the lateral rows of rocker supports and flops them from the full line position in FIG. 7 to the phantom position so that the rollers 88 at the opposite ends support the bed after the roll 81 passes. Preferably each rocker support has a pair of bumpers 89 on the ends of an arcuate flange 90 for contacting the roll 81. After the rolls 80, 81 have passed to the opposite end of the bed, another assembly operation of trusses and joists is performed on the bed and the rolls passed thereover in the opposite direction.

Lift-out mechanisms are provided for raising the trusses T and joists J above the bed after they have been joined by passage of the rolls 80 and 81 over the bed, and preparatory to transferring them laterally off the bed. As shown in FIGS. 2, 2*a*, 6 and 13, these lift-out mechanisms comprise skate roller bars 91 which are adapted to be raised vertically through the laterally extending slots 61 in the bed to lift the joined trusses and joists above the upper level of the bed so that they can be manually transferred laterally over the skate rollers 92.

The skate roller bars 91 are mounted on laterally extending support channels 93 adapted to be raised vertically above base channels 94 by scissor levers 95 having rollers at their outer ends rollably mounted in the channels 93 and 94 and powered by an air cylinder (not shown) to expand the levers 95 and raise the bars 91. Such mechanisms are shown and described in my U.S. Pat. No. 3,868,898 by reference to FIG. 27 thereof.

During the assembly operation workmen stationed at opposite sides of the bed work at the sides of the bed 20 and between the bed and the rows of conveyor rolls 22 and 23. Preferably, one workman works on top of the bed and places the toothed plates 62 above and below the truss joints and the struts *s* above and below the joists J. To facilitate the handling of the plates 62, stacks of the plates may be stored in hanging baskets, indicated in phantom at B in FIGS. 1*b* and 1*c*, at convenient locations over the bed and above the level of the frame 83 of the gantry roll 78. Overhead skate roller bars 96 preferably extend laterally above the conveyor rolls 22' and the jig bed for transferring pallets carrying toothed connector plates from lateral storage areas to the baskets B above the jig bed.

When the assembled trusses have been raised above the bed by the lift-out mechanisms they are moved laterally over the skate roller bars 91 by the workmen and transferred onto skate roller bars 98 which are swingably mounted on posts 99 adjacent the conveyor rolls 23' and **23*a*. The bars 98** are swung out of the way to the full line positions in FIGS. 1*b* and 1*c* during assembly and are swung to the phantom positions during transfer to bridge over from the bed to the conveyor rolls 23' and **23*a* for conveyance rearwardly of the bed. Similarly, skate roller bars 100 are swingably mounted between the bed and conveyor rolls 22 to transfer the assembled joists J to the rolls 22 for conveyance rearwardly of the bed. For this purpose certain of the rolls 22** may be power-driven.

Figure 12:
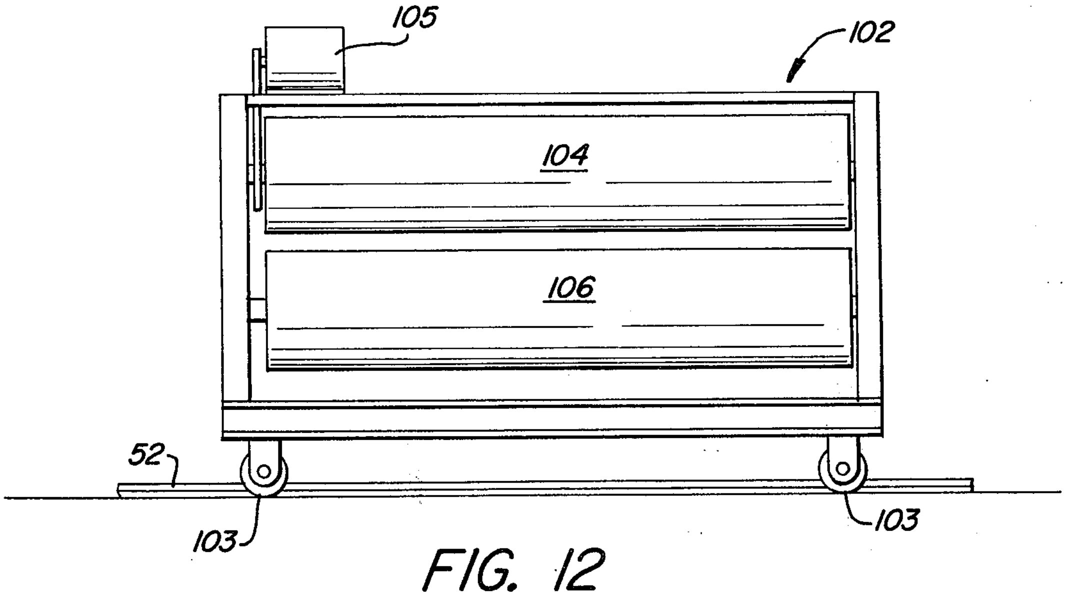
FIG. 12 is an enlarged elevational view on line 12—12 of FIG. 1*b*.

The assembled trusses are conveyed through a pair of pinch rolls indicated generally at 102 normally aligned with conveyor rolls 23, 23' and **23*a*. As shown in FIG. 12 the roll stand 102 is preferably mounted on wheels 103 for lateral movement on track 52 and comprises an upper roll 104 driven by a motor 105 and a lower idler roll 106. The bight between the rolls is substantially equal to the thickness of the trusses T (1-½ inches) so that as the trusses pass between the rolls the teeth of the top and bottom plates 62** are fully embedded in the wood joints.

As the finished trusses pass from the roll stand 102 they are conveyed rearwardly over another frame 30' with power-driven rolls **23*a* and thence over rolls 23 to a stacking station where the trusses are transferred laterally onto skate bars 108 on which they may be rotated 90° and stacked vertically. As indicated in FIG. 11, the bars 108 are supported on posts 109 and the inner posts have upper extensions 110 against which the trusses T are stacked. One or more support arms 111 extend from the top of the extensions 110 overlying the stacked truss and a retainer rod 112 depends from each arm in front of the trusses and is tied to an extension 110 by a chain 113**.

The assembled joists J, when raised above the bed by the lift-out mechanisms, are transferred over skate bars 100 to the conveyor rolls 22' and conveyed rearwardly through the pinch rolls 48 now positioned in alignment with conveyor rolls 22. The bight between the rolls 48 is substantially equal to the thickness of the joist chords positioned edgewise (3 ½inches) so that as the joists pass between the rolls the teeth at the ends of the struts *s* are fully embedded in the chords. From the rolls 48 the finished joists J pass over the aligned conveyor rolls 22, which have previously been adjusted vertically to the same horizontal level, to a stacking station where they are transferred laterally over skate roller bars 114 and stacked.

It will be apparent that an improved and efficient mass production system has been provided for fabricating wood and metal frame structures in a minimal amount of floor space with a minimal amount of manual labor. Triangular trusses and flat trusses are fabricated simultaneously on the same jig bed, and the same conveying means used to bring the components to the bed are used to convey the finished structures in a reverse direction away from the bed to storage areas.

I claim:

1. The method of fabricating frame structures having wood chord and web components joined by metal toothed connector plates, comprising providing an elongated rectangular bed on which to assemble and connect the components, conveying bundles of like components forwardly toward the sides of the bed in directions longitudinally thereof, transferring certain components laterally to stacking areas adjacent to the ends of the bed, conveying certain other components to stacking areas adjacent to the sides of the bed, selecting components from said stacking areas and assembling them on the bed to form frame structures with toothed connector plates at the top and bottom of the joints, partly embedding the teeth of said plates by passing a pair of pinch rolls longitudinally over and under said bed, transferring the frame structures laterally off opposite sides of the bed onto longitudinal rows of conveyor rolls, and moving said structures over said rolls rearwardly away from the bed and through stationary pinch rolls to fully embed the teeth of the connector plates.

2. The method as defined in claim 1, wherein the bundles of like components are conveyed forwardly toward the sides of the bed on the same longitudinal rows of conveyor rolls which convey the frame structures rearwardly away from the bed.

3. The method as defined in claim 1, wherein certain components are spliced end-to-end before transferring them laterally to stacking areas adjacent to the ends of the bed.

4. The method as defined in claim 1, wherein metal reinforcing strips are applied to the spliced components before transferring them laterally to stacking areas adjacent to the ends of the bed.

5. The method as defined in claim 1, wherein the frame structures are conveyed rearwardly from the stationary pinch rolls, and then transferred laterally and stacked.

6. The method as defined in claim 2, wherein the frame structures are conveyed rearwardly from the stationary pinch rolls, and then transferred laterally and stacked.

7. Apparatus for continuously assembling, fabricating and stacking frame structures having wood chord and web components joined by toothed metal connector plates comprising an elongated rectangular jig bed, longitudinal rows of conveyor rolls on opposite sides of said bed and extending beyond the bed to define a storage area therebetween, said conveyor rolls adapted to convey components forwardly to the bed and assembled structures rearwardly from the bed, first transfer means associated with certain of said conveyor rolls for transferring chord components laterally inward adjacent to the ends of the bed, means on the bed to hold the components and connector plates in assembled relation, pinch rolls movably supported for rolling over said bed to partially embed the teeth of the connector plates, second transfer means at opposite sides of the bed to transfer the assembled frame structures onto the rows of conveyor rolls for conveyance rearwardly from the bed, and third transfer means adjacent each row of conveyor rolls at the storage area to transfer the assembled structures laterally and support them in stacked relation in the storage area.

8. Apparatus as defined in claim 7, wherein certain of the conveyor rolls are vertically adjustable to graduated heights for conveying chords by gravity.

9. Apparatus as defined in claim 7, wherein stands of pinch rolls are movable laterally into said rows of conveyor rolls for fully embedding the teeth of the connector plates as the assembled structures pass rearwardly over the conveyor rolls and between the pinch rolls.

10. Apparatus as defined in claim 7, wherein means for splicing chord components end-to-end is located laterally outward of one of said rows of conveyor rolls, and means for moving spliced chords laterally onto said first transfer means.

11. Apparatus as defined in claim 9, wherein one stand of said laterally movable pinch rolls is adapted to embed a toothed metal reinforcing strip into said spliced chords as they are passed through said rolls.

12. Apparatus as defined in claim 7, wherein means are provided on said jig bed for simultaneously assembling components of triangular trusses and flat joist trusses of different thickness in side-by-side relation.

13. Apparatus as defined in claim 12, wherein the truss components of different thicknesses are supported on said jig bed with their top surfaces at the same horizontal level.

14. Apparatus as defined in claim 12, wherein said second transfer means is adapted to transfer the assembled triangular trusses and flat joist trusses to the rows of conveyor rolls at opposite sides of the bed for conveyance rearwardly to the storage area.

15. Apparatus as defined in claim 7, wherein laterally extending slots are provided at longitudinal intervals in said jig bed, and lift-out means are movable vertically through said slots to raise the assembled structures above the bed preparatory to lateral transfer.

16. Apparatus as defined in claim 13, wherein laterally extending slots are provided at longitudinal intervals in said jig bed, and lift-out means are movable vertically through said slots to raise the assembled triangular and flat joist trusses above the bed preparatory to lateral transfer.

17. Apparatus as defined in claim 7, wherein a plurality of the conveyor rolls in each row is mounted on a frame supporting power drive means for the rolls, and said second transfer means comprises laterally extending roller conveyor bars movably mounted on said frame, and power means for raising said bars above the level of the rolls.

18. Apparatus as defined in claim 7, wherein longitudinally spaced supporting means progressively alternately support the bed in advance of and behind the lower pinch roll as it passes under the bed.

* * * * *